(12) United States Patent
Kim (10) Patent No.: US 7,391,407 B2
(45) Date of Patent: Jun. 24, 2008

(54) BACK-LIGHT DRIVING CIRCUIT IN FIELD SEQUENTIAL LIQUID CRYSTAL DISPLAY

(75) Inventor: Tae-Soo Kim, Busan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 538 days.

(21) Appl. No.: 11/000,395

(22) Filed: Nov. 29, 2004

(65) Prior Publication Data

US 2005/0116922 A1 Jun. 2, 2005

(30) Foreign Application Priority Data

Nov. 27, 2003 (KR) .................. 10-2003-0084780

(51) Int. Cl.
*G09G 3/36* (2006.01)
*G02F 1/1333* (2006.01)

(52) U.S. Cl. .............. 345/102; 345/82; 345/690; 345/211; 315/169.3; 315/307; 349/61; 349/71; 362/600

(58) Field of Classification Search ............ 345/76–78, 345/82–84, 88, 98, 102, 690–693, 210, 211; 349/61–71; 362/600–634; 315/169.3, 307, 315/308, 312, 329
See application file for complete search history.

(56) References Cited

U.S. PATENT DOCUMENTS

| | | | | |
|---|---|---|---|---|
| 6,115,016 A | * | 9/2000 | Yoshihara et al. | 345/88 |
| 6,151,004 A | * | 11/2000 | Kaneko | 345/88 |
| 6,573,882 B1 | * | 6/2003 | Takabayashi | 345/102 |
| 6,747,617 B1 | * | 6/2004 | Kawashima | 345/76 |
| 6,867,757 B1 | * | 3/2005 | Nakamura | 345/83 |
| 7,088,334 B2 | * | 8/2006 | Adachi et al. | 345/102 |
| 2003/0178951 A1 | | 9/2003 | Park et al. | |

FOREIGN PATENT DOCUMENTS

CN 1265506 A 9/2000

(Continued)

OTHER PUBLICATIONS

Patent Abstracts of Japan, Publication No. 10-326080, dated Dec. 8, 1998, in the name of Osamu Akimoto et al.

(Continued)

*Primary Examiner*—Henry N Tran
(74) *Attorney, Agent, or Firm*—Christie, Parker & Hale, LLP (57) ABSTRACT

A back-light driving circuit controlling red (R), green (G), and blue (B) back lights providing light to a liquid crystal panel in a field sequential liquid crystal display. The back-light driving circuit includes a driving voltage generator that provides a driving voltage to each of the R, G, and B back-lights to cause them to emit light having a predetermined luminance. The back-light driving circuit also includes a pulse width modulation (PWM) signal generator for providing a PWM signal to each of the R, G, and B back-lights to control the chromaticity of the light emitted from each back-light. The driving voltages and/or PWM signals provided to each of the R, G, and B back-lights are catered to the particular characteristics of the corresponding back-light to cause them to emit color having a desired luminance and/or chromaticity.

15 Claims, 6 Drawing Sheets

FOREIGN PATENT DOCUMENTS

| | | |
|---|---|---|
| JP | 10-326080 | 12/1998 |
| JP | 2000-214825 | 8/2000 |
| JP | 2002-91401 | 3/2002 |
| JP | 2002-190392 | 7/2002 |
| JP | 2003-58125 | 2/2003 |
| JP | 2003-107424 | 4/2003 |
| JP | 2003-287734 | 10/2003 |
| JP | 2004-29141 | 1/2004 |
| JP | 2004-309509 | 11/2004 |
| JP | 2004-309510 | 11/2004 |
| JP | 2004-311460 | 11/2004 |
| JP | 2004-311461 | 11/2004 |
| JP | 2004-311635 | 11/2004 |
| JP | 2005-157387 | 6/2005 |
| WO | WO 02/048994 A1 | 6/2002 |
| WO | WO 02/080136 A1 | 10/2002 |

OTHER PUBLICATIONS

Patent Abstracts of Japan, Publication No. 2002-091401, dated Mar. 27, 2002, in the name of Masahiro Ito et al.

Patent Abstracts of Japan, Publication No. 2002-190392, dated Jul. 5, 2002, in the name of Osamu Akimoto et al.

Patent Abstracts of Japan, Publication No. 2003-058125, dated Feb. 28, 2003, in the name of Tadaaki Yoneda et al.

Patent Abstracts of Japan, Publication No. 2003-107424, dated Apr. 9, 2003, in the name of Katsumi Adachi et al.

Patent Abstracts of Japan, Publication No. 2004-029141, dated Jan. 29, 2004, in the name of Masahiko Ozawa et al.

Patent Abstracts of Japan, Publication No. 2004-309509, dated Nov. 4, 2004, in the name of Yutaka Ozaki.

Patent Abstracts of Japan, Publication No. 2004-309510, dated Nov. 4, 2004, in the name of Yutaka Ozaki.

Patent Abstracts of Japan, Publication No. 2004-311460, dated Nov. 4, 2004, in the name of Yutaka Ozaki.

Patent Abstracts of Japan, Publication No. 2004-311461, dated Nov. 4, 2004, in the name of Yutaka Ozaki.

Patent Abstracts of Japan, Publication No. 2004-311635, dated Nov. 4, 2004, in the name of Naoto Shimada.

Patent Abstracts of Japan, Publication No. 2005-157387, dated Jun. 16, 2005, in the name of Tae-Soo Kim.

Patent Abstracts of Japan, Publication No. 2000-214825, dated Aug. 4, 2000, in the name of Taisuke Nakamura.

Patent Abstracts of Japan, Publication No. 2003-287734, dated Oct. 10, 2003, in the name of Jung Kook Park, et al..

* cited by examiner

BACK-LIGHT DRIVING CIRCUIT IN FIELD SEQUENTIAL LIQUID CRYSTAL DISPLAY

CROSS-REFERENCE TO RELATED APPLICATION

This application claims priority to and the benefit of Korean Patent Application No. 2003-0084780, filed Nov. 27, 2003, the disclosure of which is incorporated herein by reference in its entirety.

BACKGROUND OF THE INVENTION

1. Field of the Invention

The present invention relates to a field sequential liquid crystal display (FS-LCD), and more particularly, to an LCD capable of obtaining desired chromaticity and luminance regardless of a driving current distribution of a light emitting diode (LED).

2. Description of Related Art

A color LCD generally includes a liquid crystal panel having an upper substrate, a lower substrate, and a liquid crystal injected between the upper and lower substrates. The color LCD further includes a driving circuit for driving the liquid crystal panel, and a back-light for providing white light to the liquid crystal. Such an LCD may be mainly classified into a red (R), green (G), blue (B) color filter type or a color field sequential driving type depending on its driving mechanism.

In the color filter type LCD, a single pixel is divided into R, G, and B subpixels, and R, G, and B color filters are respectively arranged in the R, G, and B subpixels. Light is transmitted from a single back-light to the R, G, and B color filters through the liquid crystal allowing a color image to be displayed.

On the other hand, a color FS-LCD includes R, G, and B back-lights that are arranged in a single pixel that is not divided into R, G, and B subpixels. The light of the three primary colors is provided from the R, G, and B back-lights to the single pixel through the liquid crystal so that each of the three primary colors are sequentially displayed in a time-sharing, multiplexed manner, allowing the display of a color image using a residual image effect.

Figure 1:
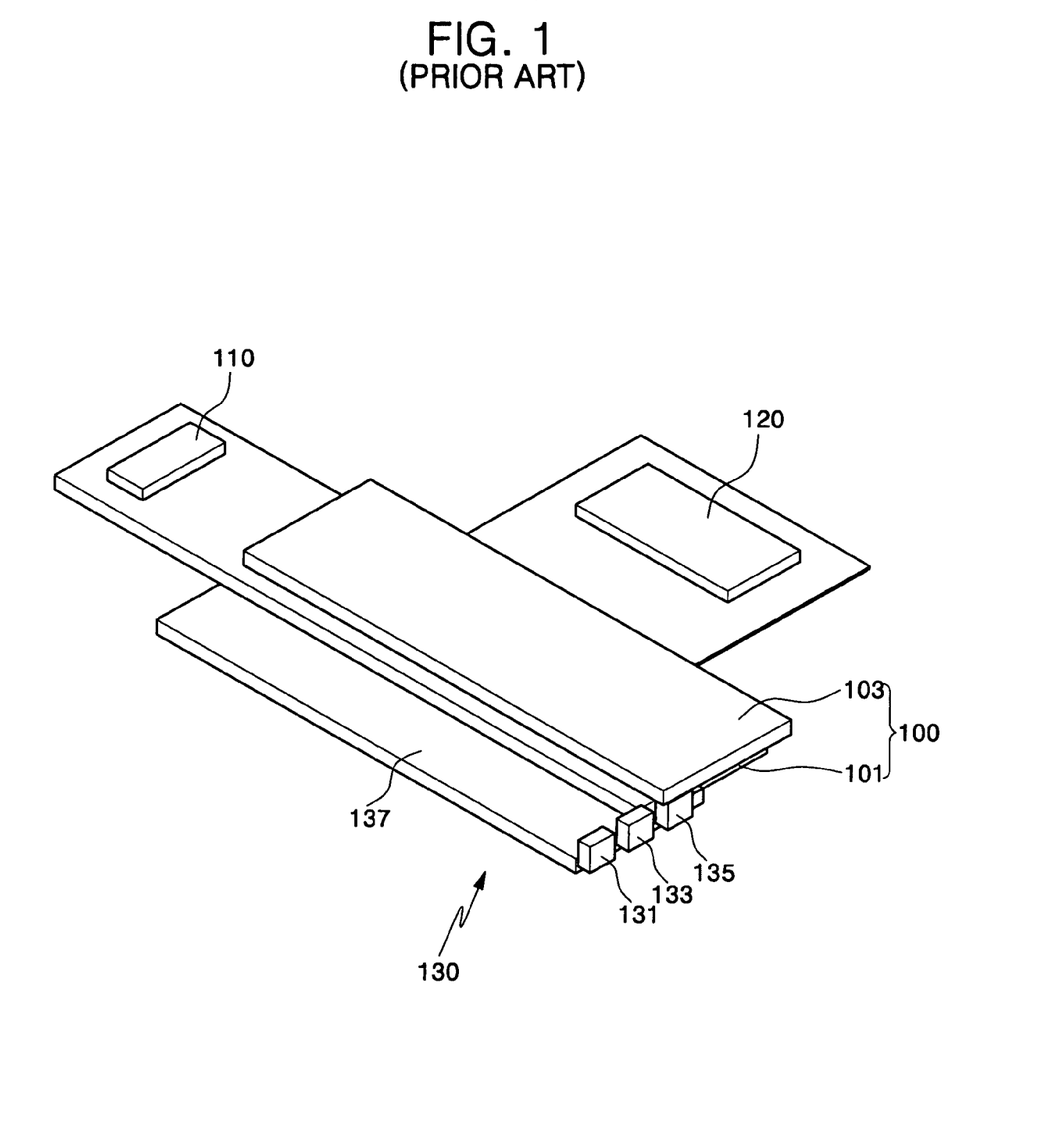
FIG. 1 is a perspective view of a configuration of a conventional field sequential liquid crystal display.

FIG. 1 is a perspective view of a configuration of a typical color FS-LCD.

Referring to FIG. 1, the FS-LCD includes a liquid crystal panel 100 having a lower substrate 101 in which a thin film transistor (TFT) array (not shown) for switching is arranged to be connected to a plurality of gate lines, a plurality of data lines, and a plurality of common lines. The liquid crystal panel also includes an upper substrate 103 in which a common electrode (not shown) is formed to provide a common voltage to the common lines. The liquid crystal panel further includes a liquid crystal (not shown) injected between the upper and lower substrates.

The FS-LCD further includes a gate line driving circuit 110 for providing scan signals to the plurality of gate lines of the liquid crystal panel 100, a data line driving circuit 120 for providing R, G, and B data signals to the data lines, and a back-light system 130 for providing light corresponding to three primary colors, namely, R, G, and B colors, to the liquid crystal panel 100.

The back-light system 130 includes three back-lights 131, 133, and 135 respectively providing R, G, and B light, and a light guide plate 137 providing the R, G, and B light respectively emitted from the R, G, and B back-lights 131, 133, and 135, to the liquid crystal of the liquid crystal panel 100.

Typically, a time interval of a single frame driven at 60 Hz is 16.7 ms (1/60 s). When the single frame is divided into three subframes, as is the case for the FS-LCD, each subframe has a time interval of 5.56 ms (1/180 s). The time interval of one subframe is short enough to prevent its field change to be perceived by the human eye. Accordingly, the human eye sees the three subframes during the time interval of 16.7 ms as a single frame, resulting in the recognition of a composite color formed by the three primary colors to display the image.

Therefore, the field sequential driving mode may achieve about three times more resolution as the color filter mode for a same-sized panel, increase light efficiency because no color filter is used, and achieve the same color reproduction as a color television set and achieve a high speed of moving picture. However, because the field sequential driving mode divides one frame into three sub-frames, it requires fast operating characteristics. That is, the field sequential driving mode requires a driving frequency of about six times the driving frequency of the color filter driving mode.

In order for the liquid crystal display to obtain the fast operating characteristics, a response speed of the liquid crystal should be fast and a corresponding switching speed for turning the R, G, and B back-lights on and off should also be relatively fast.

Figure 2:
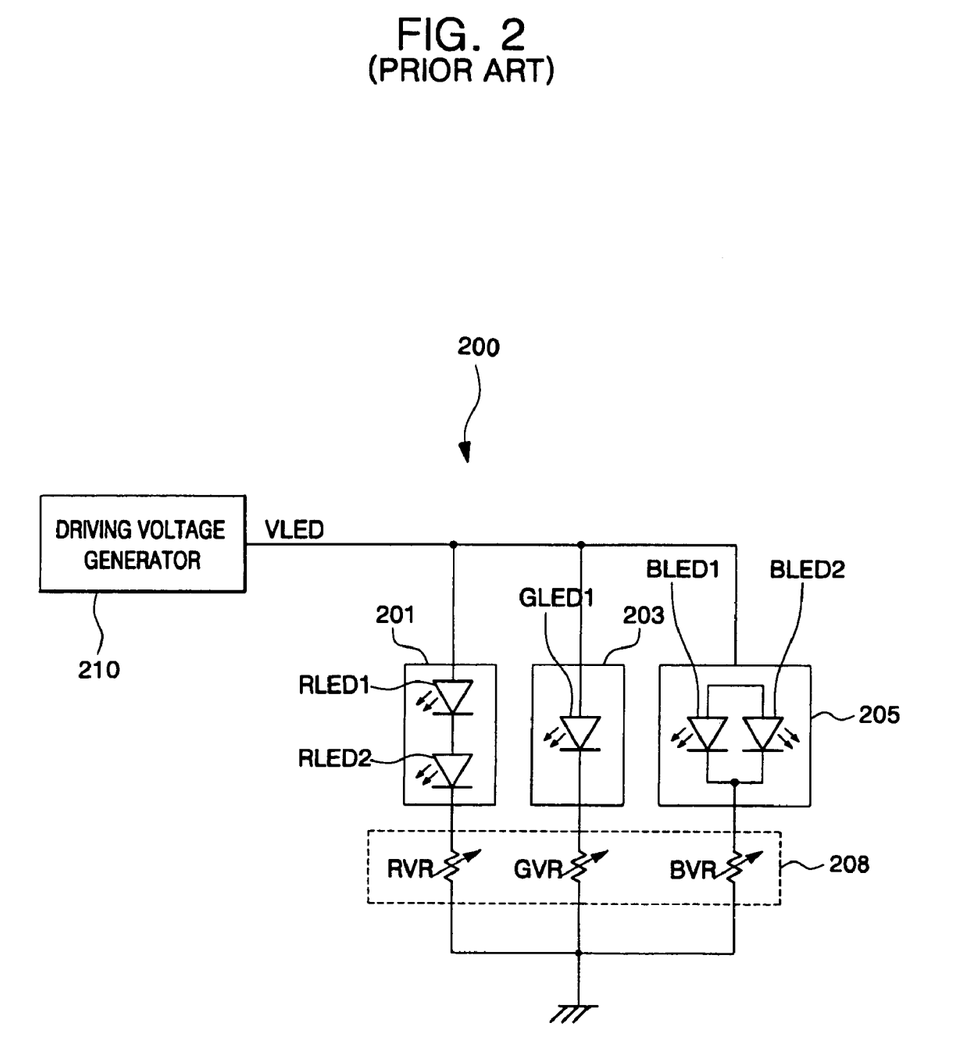
FIG. 2 is a schematic block diagram illustrating a configuration of a back-light driving circuit used in a conventional field sequential liquid crystal display.

FIG. 2 is a schematic diagram of a back-light driving circuit used in the FS-LCD of FIG. 1.

Referring to FIG. 2, a conventional back-light driving circuit includes a back-light 200 including R, G, and B back-lights 201, 203, and 205, for sequentially emitting R, G, and B light, and a driving voltage generator 210 for providing a driving voltage VLED of a same level to the R, G, and B back-lights 201, 203 and 205.

The R back-light 201 includes two R light emitting diodes (RLED1 and RLED2) serially connected for emitting R light. The G back-light 203 includes one G light emitting diode (GLED1) for emitting G light. The B back-light 205 includes two B light emitting diodes (BLED1 and BLED2) connected in parallel for emitting B light.

The driving voltage generator 210 provides the driving voltage (VLED) of the same level to all of the R, G, and B back-lights 201, 203 and 205 forming the back-light 200. The driving voltage (VLED) is provided to an anode electrode of the R light emitting diode (RLED1) in the R back-light 201, to an anode electrode of the G light emitting diode (GLED1) in the G back-light 203, and to anode electrodes of the two B light emitting diodes (BLED1, BLED2) in the B back-light 205.

The conventional back-light driving circuit further includes a luminance adjuster 208 serially connected between the back-lights 201, 203, and 205 and the ground for adjusting luminance of light emitted from the back-light 200. The luminance adjuster 208 includes a first variable resistor (RVR) connected between a cathode electrode of the R light emitting diode (RLED2) in the R back-light 201 and the ground for adjusting luminance of light emitted from the R back-light 201, a second variable resistor (GVR) connected between a cathode electrode of the G light emitting diode (GLED1) in the G back-light 203 and the ground for adjusting luminance of light emitted from the G back-light 203, and a third variable resistor (BVR) connected between the cathode electrodes of the two B light emitting diodes (BLED1, BLED2) in the B back-light 205 and the ground for adjusting luminance of light emitted from the B back-light 205.

Conventionally, although forward driving voltages (RVf, GVf and BVf) of the light emitting diodes (RLED, GLED and BLED) in the R, G and B back-lights 201, 203 and 205 are different from one another, the same driving voltage, for example, 4V is provided to the R, G and B back-lights 201, 203 and 205 from the driving voltage generator 210. For example, the R light emitting diode (RLED) requires a forward driving voltage (RVf) of 2.2 V. The G light emitting diode (GLED) requires a forward driving voltage (GVf) of 3.3 V. The B light emitting diode (BLED) requires a forward driving voltage (BVf) of 3.4 V.

Conventionally, since all the R, G and B back-lights 201, 203 and 205 are provided with the same driving voltage (VLED) of 4V, when trying to drive the R light emitting diodes (RLED1 and RLED2), the R light emitting diodes (RLED1 and RLED2) are applied with a forward driving voltage (RVf) of 2.2V through the first variable resistor (RVR) to adjust luminance of light emitted from the R back-light 201.

When trying to drive the G light emitting diode (GLED1), the G light emitting diode (GLED1) is applied with a forward driving voltage (GVf) of 3.3V through the second variable resistor (GVR) to adjust luminance of light emitted from the G back-light 203. Furthermore, when trying to drive the B light emitting diodes (BLED1 and BLED2), the B light emitting diodes (BLED1 and BLED2) are provided with a forward driving voltage (BVf) of 3.4V through the third variable resistor (BVR) to adjust luminance of light emitted from the B back-light 205.

Therefore, the conventional back-light driving circuit as described above is provided with the same driving voltage of 4V, regardless of whether the R, G and B light emitting diodes are driven with driving voltages that differ from one another. Since the R, G, and B light emitting diodes are provided with the same driving voltage during the three sub-frames of a single frame used to drive the R, G and B light emitting diodes, power consumption is increased. Furthermore, the driving voltage generating circuit according to conventional mechanisms needs to generate a driving voltage that generally corresponds to the largest voltage of the driving voltages required for the R, G and B light emitting diodes.

Another problem is that the forward driving voltages provided to the R, G and B light emitting diodes in each sub-frame need to be manually adjusted using the variable resistors. When distribution of driving currents of the light emitting diodes is large, it is difficult to provide the forward driving voltages suitable for the respective R, G and B light emitting diodes by only manually adjusting them using the variable resistors.

SUMMARY OF THE INVENTION

The various embodiments of the present invention provide a back-light driving circuit providing driving voltages suitable for each light emitting diode regardless of the distribution of driving currents of the light emitting diodes. The catering of the driving voltages to the particular characteristic of the corresponding light emitting diode helps decrease power consumption and helps maximize efficiency of the driving circuit.

The various embodiments present invention also provide for a back-light driving circuit capable of optimizing color purity using PWM values that are catered to the particular light emitting diodes.

According to one embodiment of the invention, the back-light driving circuit includes a driving voltage generator providing a driving voltage to each of a plurality of back-lights for causing each of the plurality of back-lights to emit light having a predetermined luminance. At least two of the driving voltages have different driving voltage values. The back-light driving circuit also includes a pulse width modulation (PWM) signal generator providing a PWM signal to each of the plurality of back-lights for controlling chromaticity of light emitted from each of the plurality of back-lights. At least two of the PWM signals are associated with different PWM values.

According to one embodiment, at least one of the back-lights includes at least two light emitting diodes.

According to one embodiment, a single frame is divided into four sub-frames, and the plurality of back-lights respectively include red (R), green (G), and blue (B) light emitting diodes that are respectively driven in three of the four sub-frames. The R, G and B light emitting diodes are simultaneously driven in a fourth sub-frame or at least one of the R, G and B light emitting diodes is driven in the fourth sub-frame.

The R, G, and B light emitting diodes may be driven in an arbitrary order in the three sub-frames, and the fourth sub-frame may be arbitrarily selected from among the four sub-frames.

The R, G and B light emitting diodes may each be provided with a different driving voltage from the driving voltage generator, or at least one of the driving voltages provided to the R, G, and B light emitting diodes may be different from two of the driving voltages provided from the driving voltage generator.

The plurality of backlights may be driven during a single frame including four sub-frames, the plurality of back-lights respectively including R, G, and B light emitting diodes that are driven in three of the four sub-frames, and a white (W) light emitting diode that is driven in a remaining sub-frame of the four sub-frames.

According to one embodiment, the R, G, B, and W light emitting diodes may be driven in an arbitrary order within the four sub-frames.

According to one embodiment, the plurality of back-lights include at least one of each of R, G, and B back-lights.

The plurality of back-lights may include at least two back-lights associated with the same color. The two back-lights associated with the same color may receive different driving voltages from the driving voltage generator. The two back-lights associated with the same color may also receive different PWM signals from the PWM signal generator.

According to one embodiment, the plurality of back-lights include red, green, and blue back-lights, and the driving voltage generator includes a register with prestored driving voltages corresponding to the red, green, and blue back-lights. The PWM signal generator may further include a register with prestored PWM values corresponding to the red, green, and blue back-lights.

The back-light driving circuit may further include a controller providing signals to the PWM signal generator for controlling selection of a light emitting diode.

BRIEF DESCRIPTION OF THE DRAWINGS

The above and exemplary embodiments of the present invention will be described with reference to the attached drawings in which.

DETAILED DESCRIPTION

Figure 3:
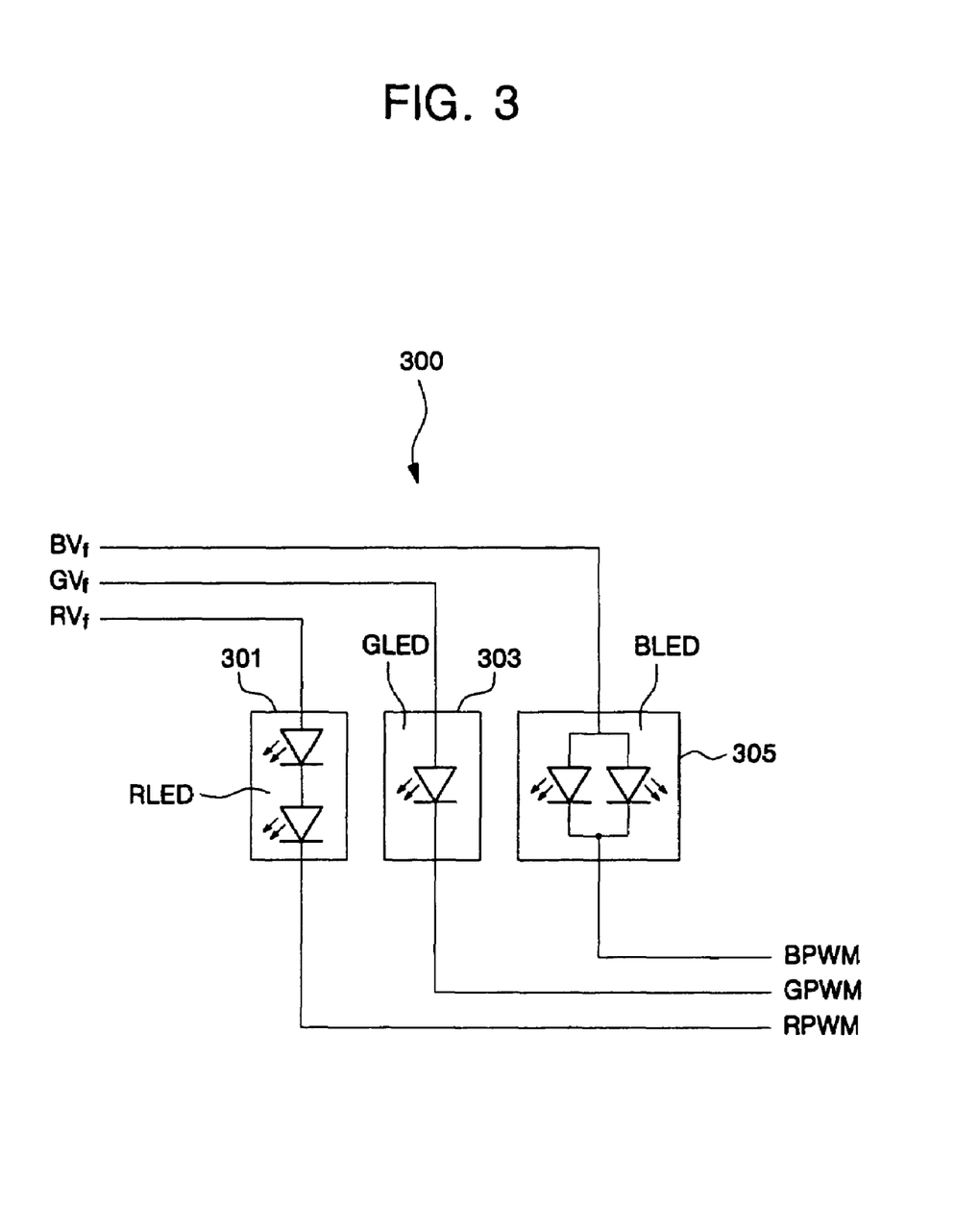
FIG. 3 is a schematic diagram illustrating a configuration of a back-light driving circuit used in a field sequential liquid crystal display in accordance with an embodiment of the present invention.

FIG. 3 is a schematic diagram illustrating a configuration of a back-light driving circuit used in a field sequential liquid crystal display in accordance with an embodiment of the present invention.

The back-light driving circuit according to the embodiment in FIG. 3 sequentially provides forward driving voltages suitable for respective R, G and B light emitting diodes (RLED, GLED and BLED) to R, G and B back-lights 301, 303 and 305, and drives the respective R, G and B light emitting diodes (RLED, GLED and BLED) by the forward driving voltages so as to achieve a luminance adjusted color. The back-light driving circuit also optimizes chromaticity by controlling different PWM values (RPWM, GPWM and BPWM) suitable for the R, G and B light emitting diodes (RLED, GLED and BLED). According to one embodiment, Pulse Width Modulation (PWM) values for the respective R, G and B light emitting diodes (RLED, GLED and BLED) are different from one another.

For example, in the case where one frame includes three sub-frames for sequentially driving the R, G and B light emitting diodes (RLED, GLED and BLED) in each sub-frame, a forward driving voltage (RVf) suitable for the R light emitting diode (RLED) is provided in a first sub-frame to drive the R light emitting diode (RLED). Subsequently, a forward driving voltage (GVf) suitable for the G light emitting diode (GLED) is provided in a second sub-frame to drive G light emitting diode (GLED), and a forward driving voltage (BVf) suitable for the B light emitting diode (BLED) is provided in a third sub-frame to drive the B light emitting diode (BLED).

When driving the R light emitting diode (RLED) by generating the driving voltage (RVf) suitable for the R light emitting diode (RLED) in the first sub-frame, a PWM value (RPWM) suitable for the R light emitting diode (RLED) is also provided to adjust chromaticity of the R color. When driving the G light emitting diode (GLED) by generating the driving voltage (GVf) suitable for the G light emitting diode (GLED) in the second sub-frame, a PWM value (GPWM) suitable for the G light emitting diode (GLED) is also provided to adjust chromaticity of G color. When driving the B light emitting diode (BLED) by generating the driving voltage (BVf) suitable for the B light-emitting diode (BLED) in the third sub-frame, a PWM value (BPWM) suitable for the B light emitting diode (BLED) is provided to adjust chromaticity of B color in the third sub-frame.

Accordingly, the R, G and B colors having desired luminance is achieved by generating the forward driving voltages suitable for the respective R, G and B light emitting diodes (RLED, GLED and BLED), and chromaticity also adjusted based on the PWM values of the R, G and B light emitting diodes (RLED, GLED and BLED). Therefore, a color having optimized chromaticity at predetermined luminance is provided.

Figure 4:
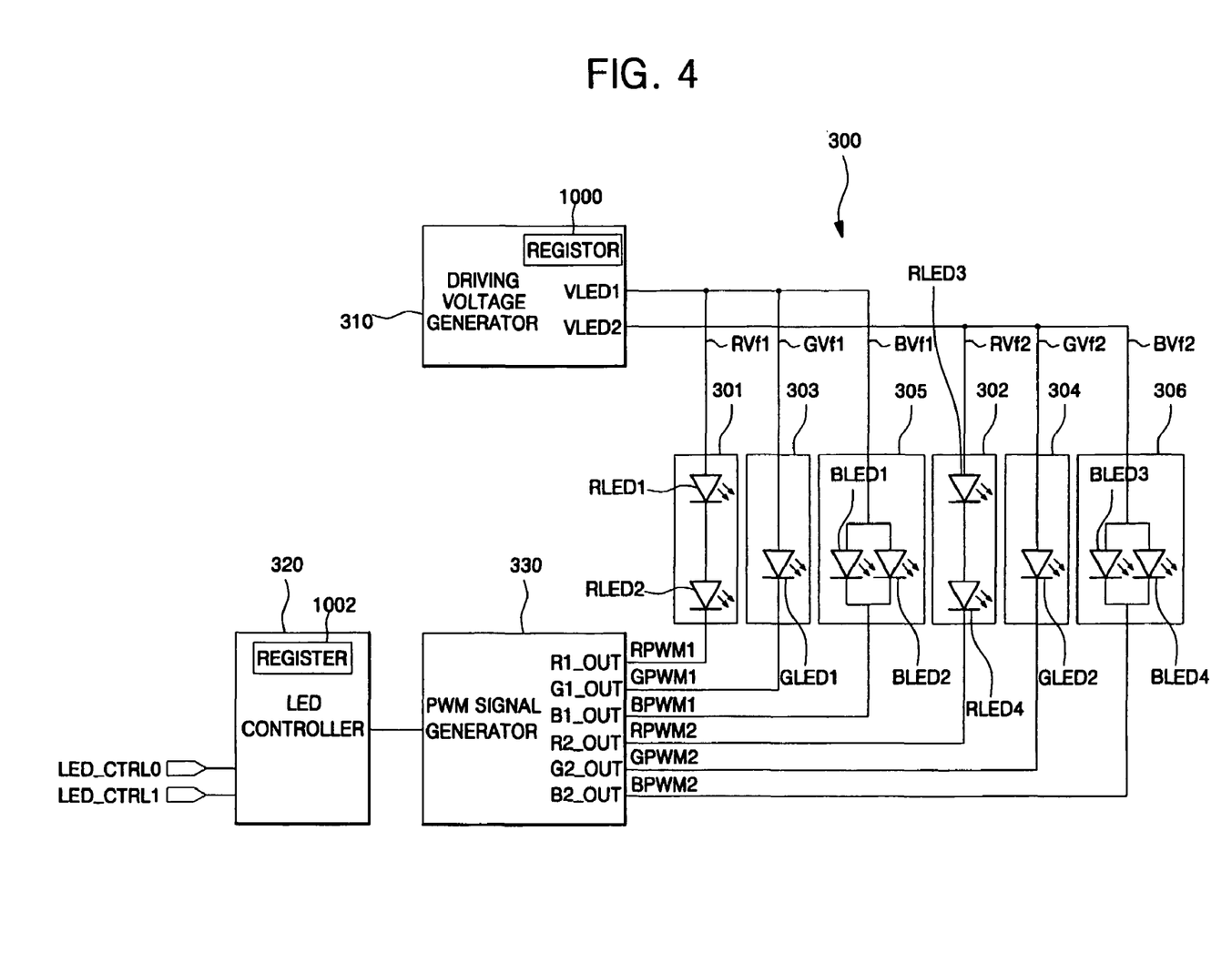
FIG. 4 is another schematic block diagram illustrating a configuration of a back-light driving circuit used in a field sequential liquid crystal display in accordance with an embodiment of the present invention.

FIG. 4 is another schematic block diagram of a configuration of a back-light driving circuit in accordance with an embodiment of the present invention.

Referring to FIG. 4, the back-light driving circuit includes a back-light 300 for generating R, G and B lights, driving voltage generator 310 for providing driving voltages (VLED1 and VLED2) to the back-light 300, LED controller 320 for controlling the drive of the back-light 300 according to first and second control signals (LED_CTRL0 and LED_CTRL1), and PWM signal generator 330 for generating the PWM signal to the back-light 300 according to output signals provided from the LED controller 320.

The back-light 300 includes R back-lights 301 and 302 for emitting light of R color, G back-lights 303 and 304 for emitting light of G color, and B back-lights 305 and 306 for emitting light of B color.

In the illustrated embodiment, each of the R back-lights 301 and 302 includes two serially connected R light emitting diodes (RLED1 and RLDE2) and (RLED3 and RLED4), respectively, wherein anode electrodes of the light emitting diodes (RLED1) and (RLED3) are provided with the forward driving voltages (RVf1 and RVf2), respectively, for driving the R light emitting diodes from output terminals (VLED1) and (VLED2) of the driving voltage generator 310.

Each of the G back-lights 303 and 304 includes one G light emitting diode (GLED1) and (GLDE2) respectively, wherein anode electrodes of the light emitting diodes (GLED1) and (GLED2) are provided with the forward driving voltages (GVf1 and GVf2), respectively, for driving the G light emitting diode from the output terminals (VLED1) and (VLED2) of the driving voltage generator 310.

Each of the B back-lights 305 and 306 includes two B light emitting diodes (BLED1 and BLDE2) and (BLED3 and BLED4) where the B light emitting diodes in each B back-light are connected in parallel. Anode electrodes of the light emitting diodes (BLED1, BLED2) and (BLED3, BLED4) are respectively provided with the forward driving voltages (BVf1 and BVf2), for driving the B light emitting diodes from the output terminals (VLED1) and (VLED2) of the driving voltage generator 310.

Figure 6A:
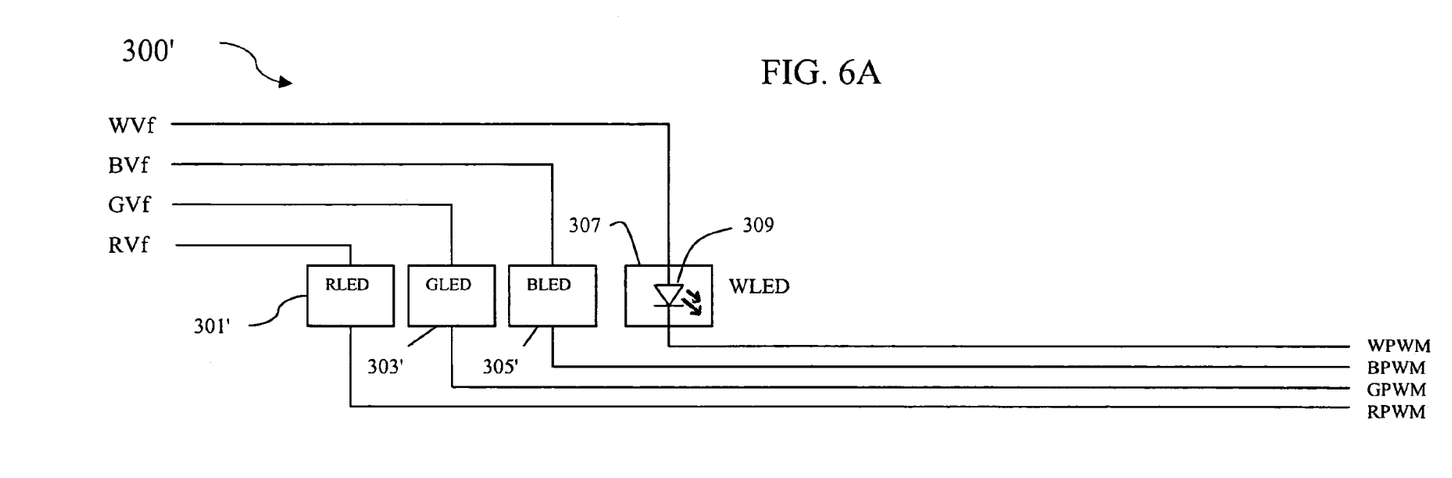
FIG. 6A is a schematic diagram illustrating a configuration of a back-light driving circuit used in a field sequential liquid crystal display in accordance with an embodiment of the present invention.

In an embodiment of the present invention, the back-light 300 includes only R, G and B light emitting diodes, but a backlight 300' in another embodiment (see, for example, FIG. 6A) includes the R, G and B light emitting diodes in R, G, B back-lights 301', 303', 305' and a W light emitting diode 309 for emitting a W (white) color in a W back-light 307 coupled between $WV_f$ and WPWM signals. Also, in the illustrated embodiment, each of the R, G and B back-lights include two back-lights. However, each back light but may include one or a plurality number of light emitting diodes.

The driving voltage generator 310 sequentially generates the respective forward driving voltages (RVf1 and RVf2), (GVf1 and GVf2) and (BVf1 and BVf2) suitable for the R, G and B back-lights 301 and 302, 303 and 304, and 305 and 306 constituting the back-light 300. According to one embodiment, the driving voltage generator 310 includes a register 1000 for storing the forward driving voltages (RVf), (GVf) and (BVf) of the R, G and B back-lights.

Accordingly, the driving voltage generator 310 provides the respective driving voltages (RVf1 and RVf2) suitable for the R light emitting diodes to the anode electrodes of the R light emitting diodes (RLED1 and RLED3) in the R sub-frame to drive the R light emitting diodes, the respective driving voltages (GVf1 and GVf2) suitable for the G light emitting diodes to the anode electrodes of the G light emitting diodes (GLED1 and GLED2) in the G sub-frame to drive the G light emitting diodes, and the respective driving voltages (BVf1 and BVf2) suitable for the B light emitting diodes to the anode electrodes of the B light emitting diodes (BLED1, BLED2) and (BLED3, BLED4) in the B sub-frame to drive the B light emitting diodes.

According to one embodiment, the driving voltage generator 310 provides the same driving voltages (RVf1 and RVf2) to the R back-lights 301 and 302, respectively, the same driving voltages (GVf1 and GVf2) to the G back-lights 303 and 304, respectively, and the same driving voltages (BVf1 and BVf2) to the B back-lights 305 and 306, respectively.

According to another embodiment, when the distribution of the driving currents of the respective light emitting diodes is not uniform, the driving voltage generator provides different driving voltages (RVf1 and RVf2) suitable for the R back-lights 301 and 302, different driving voltages (GVf1 and GVf2) suitable for the G back-lights 303 and 304, and the different driving voltages (BVf1 and BVf2) suitable for the B back-lights 305 and 306.

Furthermore, the driving voltages (RVf), (GVf) and (BVf) provided to the R, G and B back-lights may be different from one another. For example, all the driving voltages (RVf), (GVf) and (BVf) provided to the R, G and B back-lights may be different from one another, or different driving voltages may be provided to only one or two of the R, G and B back-lights.

The LED controller 320 outputs signals for driving the corresponding back-light of the R, G and B back-lights in the corresponding frame of a plurality of sub-frames constituting one frame according to first and second control signals (LED_CTRL0) and (LED_CTRL1).

The PWM signal generator 330 generates the corresponding PWM signals (RPWM1 and RPWM2), (GPWM1 and GPWM2) and (BPWM1 and BPWM2) to the R, G and B back-lights 301 and 302, 303 and 304, and 305 and 306 according to the output signals of the LED controller 320. According to one embodiment, the LED controller includes a register 1002 for storing the PWM signals of the respective R, G and B back-lights.

In the illustrated embodiment, the PWM signal generator 330 provides the respective PWM signals (RPWM1 and RPWM2) to cathode electrodes of the light emitting diodes (RLED2 and RLED4) of the R back-lights 301 and 302 in the R sub-frame of a plurality of sub-frames constituting one frame to drive the R back-lights 301 and 302, respectively. The PWM signal generator 330 provides the respective PWM signals (GPWM1 and GPWM2) to cathode electrodes of the light emitting diodes (GLED1 and GLED2) of the G back-lights 303 and 304 in the G sub-frame to drive the G back-lights 303 and 304, respectively. The PWM signal generator 330 also provides the respective PWM signals (BPWM1 and BPWM2) to cathode electrodes of the light emitting diodes (BLED1, BLED2) and (BLED3, BLED4) of the B back-lights 305 and 306 in the B sub-frame to drive the B back-lights 305 and 306, respectively.

According to one exemplary embodiment of the present invention, since each of the R, G and B back-lights includes two back-lights 301 and 302, 303 and 304, and 305 and 306 respectively, the PWM signal generator 330 provides the respective first PWM signals (RPWM1), (GPWM1) and (BPWM1) to R, G and B light emitting diodes (RLED2), (GLED1) and (BLED1, BLED2) in the first R, G, and B back-lights 301, 303, and 305, and the respective second PWM signals (RPWM2), (GPWM2) and (BPWM2) to R, G and B light emitting diodes (RLED4), (GLED2) and (BLED3, BLED4) in the second R, G, and B back-lights 302, 304, and 306.

According to one embodiment, the PWM signal generator 330 may provide the same PWM signals (RPWM1 and RPWM2) to the R light emitting diodes (RLED2 and RLED4), the same PWM signals (GPWM1 and GPWM2) to the G light emitting diodes (GLED1 and GLED2), and the same PWM signals (BPWM1 and BPWM2) to the B light emitting diodes (BLED1, BLED2) and (BLED3, BLED4), respectively.

According to another embodiment, when distribution of the driving currents of the respective light emitting diodes is not uniform, the PWM signal generator 330 may provide the different PWM signals (RPWM1 and RPWM2) suitable for the R light emitting diodes (RLED2 and RLED4), the different PWM signals (GPWM1 and GPWM2) suitable for the G light emitting diodes (GLED1 and GLED2), and the different PWM signals (BPWM1 and BPWM2) suitable for the B light emitting diodes (BLED1, BLED2) and (BLED3, BLED4), respectively.

When providing the different driving voltages to the R, G and B light emitting diodes respectively, all the driving voltages provided to the R, G and B light emitting diodes may be different from one another, or different driving voltages may be provided to only one or two of the R, G and B light emitting diodes.

Figure 5:
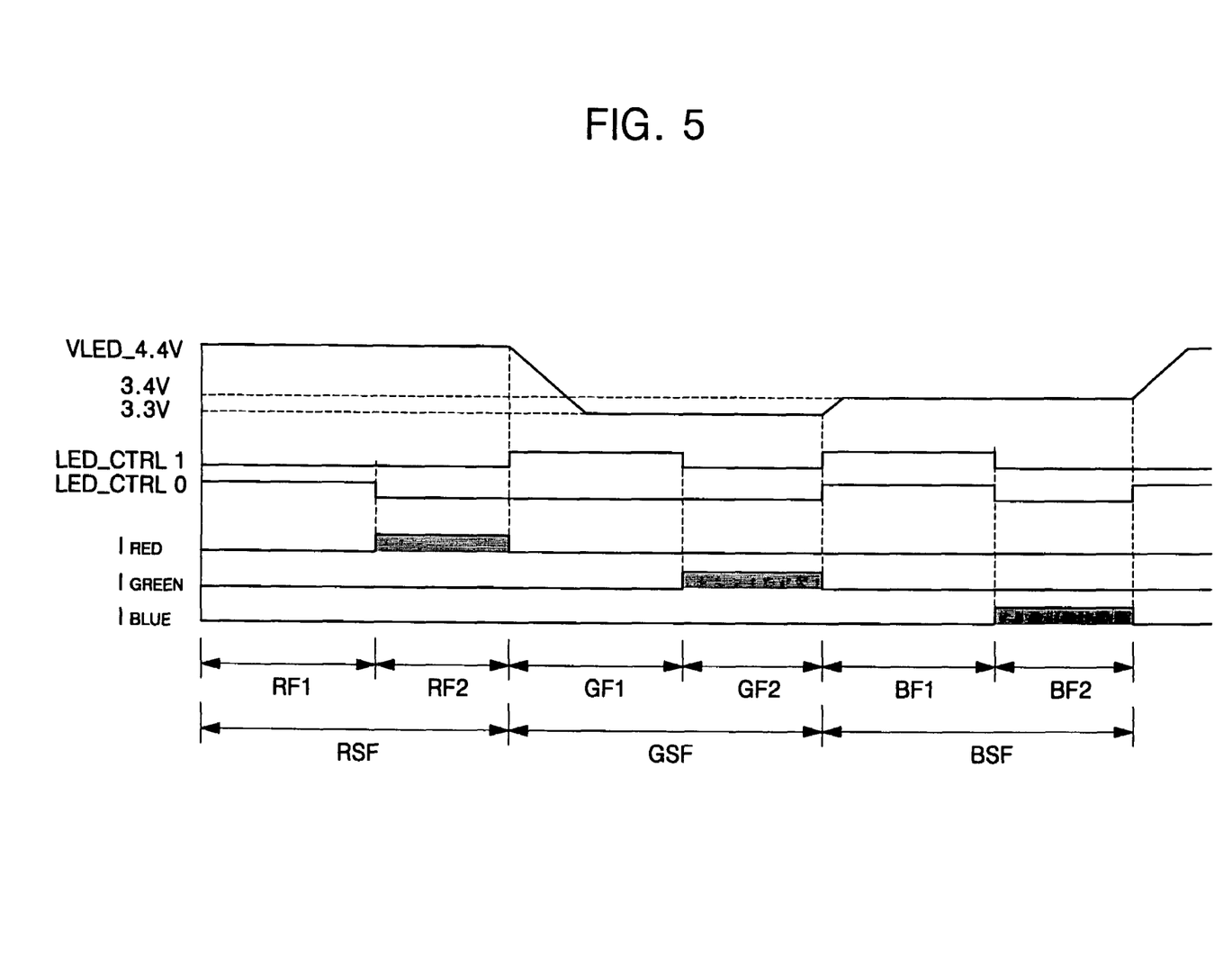
FIG. 5 is a signaling diagram of the back-light driving circuit of FIG. 4.

FIG. 5 is a signaling diagram of the back-light driving circuit of FIG. 4 according to one embodiment of the invention.

In the embodiment of the present invention, it is assumed that one frame includes three sub-frames, that is an R sub-frame (RSF) for driving an R back-light, a G sub-frame (GSF) for driving a G back-light and a B sub-frame (BSF) for driving a B back-light, and the R, G and B back-lights are sequentially driven in the order of the R, G and B back-lights for one frame.

The driving voltage generator 310 provides driving voltages, for example, forward driving voltages (RVf1 and RVf2) of 4.4V to the R light emitting diodes (RLED1 and RLED3) in the R sub-frame. At this time, the LED controller 320 is provided with first and second control signals (LED_CTRL0) and (LED_CTRL1) of a high state or low state for driving the R back-lights 301 and 302, respectively, as shown in FIG. 5. In response, the LED controller 320 provides its output signals to the PWM signal generator 330 for driving the R back-lights 301 and 302 of the R, G and B back-lights 300.

In the embodiment illustrated in FIGS. 4 and 5, the R back-lights 301 and 302 include two R light emitting diodes serially connected to receive a voltage of 4.4V from the driving voltage generator 310. However, a person of skill in the art should recognize that the R back-lights may receive a driving voltage of 2.2V by connecting the two R light emitting diodes in parallel.

The PWM signal generator 330 generates the PWM signals (RPWM1 and RPWM2) used to drive the R back-lights 301 and 302 by the output signals provided from the LED controller 320 through its output terminals (R1_OUT and R2_OUT). Therefore, the R back-lights 301 and 302 enable the driving currents corresponding to the corresponding forward driving voltages (RVf1 and RVf2) applied to anodes of the light emitting diodes (RLED1 and RLED3) and the corresponding PWM signals (RPWM1 and RPWM2) applied to cathodes of the light emitting diodes (RLED2 and RLED4) to flow as shown in FIG. 5, and thus, emit light of R color having predetermined luminance and chromaticity.

Subsequently, the driving voltage generator 310 provides driving voltages, for example, forward driving voltages (GVf1 and GVf2) of 3.4V to the G back-lights 303 and 304 in the G sub-frame. At this time, the LED controller (320) is applied with first and second signals (LED_CTRL0) and (LED_CTRL1) of a high state or low state, for driving the G back-lights 303 and 304, respectively, as shown in FIG. 5. In response, the LED controller 320 provides its output signals to the PWM signal generator 330 for driving the G back-lights of the R, G and B back-lights.

The PWM signal generator 330 generates the PWM signals (GPWM1 and GPWM2) used to drive the G back-light 303 and 304 by the output signals provided from the LED controller 320, through its output terminals (G1_OUT and G2_OUT). Therefore, the G back-lights 303 and 304 enable the driving currents corresponding to the corresponding forward driving voltages (GVf1 and GVf2) applied to anodes of the light emitting diodes (GLED1 and GLED2) and the corresponding PWM signals (GPWM1 and GPWM2) applied to cathodes of the light emitting diodes (GLED1 and GLED2) to flow as shown in FIG. 5, and thus, emit light of G color having predetermined luminance and chromaticity.

The driving voltage generator 310 provides driving voltages, for example, forward driving voltages (BVf1 and BVf2) of 3.3V to the B back-lights 305 and 306 in the B sub-frame. At this time, the LED controller 320 is provided with first and second signals (LED_CTRL0) and (LED_CTRL1) of a high state or low state, for driving the B back-lights 305 and 306, respectively, as shown in FIG. 5. In response, the LED controller 320 provides its output signals to the PWM signal generator 330 for driving the B back-lights 305 and 306 of the R, G and B back-lights.

The PWM signal generator 330 generates the PWM signals (BPWM1 and BPWM2) used to drive the B back-light 305 and 306 by the output signals provided from the LED controller 320, through its output terminals (B1_OUT and B2_OUT). Therefore, the B back-lights 305 and 306 enable the driving currents corresponding to the corresponding forward driving voltages (BVf1 and BVf2) applied to anodes of the light emitting diodes (BLED1, BLED2) and (BLED3, BLED4) and the corresponding PWM signals (BPWM1 and BPWM2) applied to cathodes of the light emitting diodes (BLED1, BLED2) and (BLED3, BLED4) to is flow as shown in FIG. 5, and thus, emit light of B color having predetermined luminance and chromaticity.

Therefore, since the forward driving voltages (RVf1 and RVf2), (GVf1 and GVf2) and (BVf1 and BVf2) of the R, G and B back-lights generated from the driving voltage generator 310 and the driving currents corresponding to the PWM signals (RPWM1 and RPWM2), (GPWM1 and GPWM2) and (BPWM1 and BPWM2) of the R, G and B back-lights generated from the PWM signal generator 330 flow during one frame, light having predetermine luminance and chromaticity is emitted.

Figure 6B:
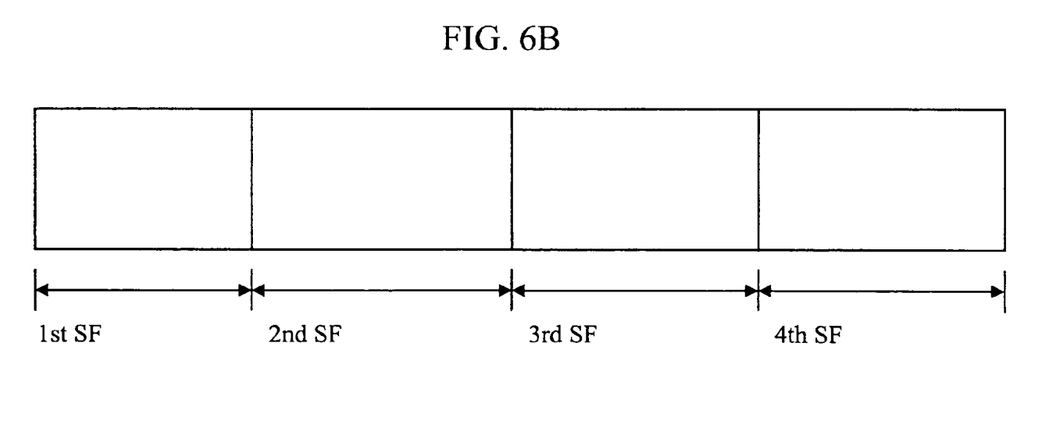
FIG. 6B is a schematic frame division diagram in accordance with an embodiment of the present invention.

Although the embodiment illustrated in FIG. 5 divides one frame into three sub-frames and sequentially drives the R, G and B light emitting diodes in each sub-frame, it will be apparent to a person of skill in the art that is also possible to divide one frame into at least four sub-frames (see, for example, FIG. 6B), sequentially drive the R, G and B light emitting diodes in the three sub-frames, and drive all the R, G and B light emitting diodes or at least one of the R, G and B light emitting diodes in the remaining one frame. Furthermore, it is also possible that the back-lights of the invention include R, G, B and W light emitting diodes for driving the R, G and B light emitting diodes in the three sub-frames of the four sub-frames and the W light emitting diode in the remaining one sub-frame.

Furthermore, although according to one embodiment of the invention the R, G and B light emitting diodes (RLED, GLED and BLED) are controlled to emit in the order of R, G and B in each sub-frame of a single frame, it is possible to arbitrarily change the order for emitting the light emitting diodes in order to obtain optimal luminance and chromaticity. Also, although the embodiment illustrated in FIG. 5 divides one sub-frame into two intervals (RF1 and RF2), (GF1 and GF2) and (BF1 and BF2) where the first intervals RF1, GF1, and BF1 are control intervals for selecting forward driving voltages suitable for the R, G, and B light emitting diodes, and second intervals RF2, GF2, and BF2 are used to generate the selected forward driving voltages to drive each of the light emitting diodes, as shown in FIG. 5, the present invention is not limited to this embodiment, and other embodiments may be possible where more than two intervals are used, or where the intervals are used differently or in a different order from what is described with respect to FIG. 5.

The back-light driving circuit according to the above-described exemplary embodiments stores the forward driving voltages suitable for respective R, G and B light emitting diodes in the register 1000 and stores the PWM values suitable for the R, G and B light emitting diodes in the other register 1002, and generates the forward driving voltages and the PWM signals corresponding to the R, G and B light emitting diodes in each of the sub-frames, thereby emitting light having optimal luminance and chromaticity as well as increasing its efficiency.

Although the present invention has been described with reference to certain exemplary embodiments, it will be understood by those skilled in the art that a variety of modifications and variations may be made to the present invention without departing from the spirit or scope of the present invention. Of course, the scope of the invention is to be determined by the appended claims and their equivalents.

What is claimed is:

1. A back-light driving circuit comprising:
    a driving voltage generating means for providing a corresponding one of a plurality of driving voltages to each of a plurality of back-lights for causing each of the plurality of back-lights to emit light, wherein each of the back-lights includes at least one light emitting diode having a first terminal and a second terminal, wherein the corresponding one of the driving voltages is provided to the first terminal of the at least one light emitting diode of each of the back-lights, and wherein at least two of the driving voltages have different driving voltage values; and
    a pulse width modulation (PWM) signal generating means for providing a corresponding one of a plurality of PWM signals to the second terminal of the at least one light emitting diode of each of the plurality of back-lights for controlling chromaticity of the light emitted from each of the plurality of back-lights, the PWM signal generating means comprising a register storing PWM values corresponding to the back-lights, wherein at least two of the PWM signals are associated with different said PWM values.

2. The back-light driving circuit according to claim 1, wherein at least one of the plurality of back-lights includes at least two light emitting diodes.

3. The back-light driving circuit according to claim 1, wherein a single frame is divided into four sub-frames, and the plurality of back-lights include red (R), green (G), and blue (B) light emitting diodes that are respectively driven in three of the four sub-frames, and the R, G and B light emitting diodes are simultaneously driven in a fourth sub-frame or at least one of the R, G and B light emitting diodes is driven in the fourth sub-frame.

4. The back-light driving circuit according to claim 3, wherein the R, G and B light emitting diodes are each provided with a different driving voltage of the driving voltages from the driving voltage generating means, or at least one of the driving voltages provided to the R, G, and B light emitting diodes is different from two of the driving voltages provided from the driving voltage generating means.

5. The back-light driving circuit according to claim 1, wherein the plurality of backlights are driven during a single frame including four sub-frames, the plurality of back-lights including red (R), green (G), and blue (B) light emitting diodes driven in three of the four sub-frames and a white (W) light emitting diode driven in a remaining sub-frame of the four sub-frames.

6. The back-light driving circuit according to claim 1, wherein the plurality of back-lights include at least one of each of red (R), green (G), and blue (B) back-lights.

7. The back-light driving circuit according to claim 1, wherein the plurality of back-lights include red, green, and blue back-lights, and the PWM values stored in the register are prestored PWM values corresponding to the red, green, and blue back-lights.

8. The back-light driving circuit according to claim 1, further comprising a control means providing signals to the PWM signal generating means for controlling selection of the at least one light emitting diode of each of the back-lights.

9. The back-light driving circuit according to claim 1, wherein the first terminal of the at least one light emitting diode of each of the back-lights is an anode of the at least one light emitting diode.

10. The back-light driving circuit according to claim 1, wherein the second terminal of the at least one light emitting diode of each of the back-lights is a cathode of the at least one light emitting diode.

11. A back-light driving circuit comprising:
a driving voltage generating means for providing a corresponding one of a plurality of driving voltages to each of a plurality of back-lights for causing each of the plurality of back-lights to emit light, wherein each of the back-lights includes at least one light emitting diode having a first terminal and a second terminal, wherein the corresponding one of the driving voltages is provided to the first terminal of the at least one light emitting diode of each of the back-lights, and wherein at least two of the driving voltages have different driving voltage values; and
a pulse width modulation (PWM) signal generating means for providing a corresponding one of a plurality of PWM signals to the second terminal of the at least one light emitting diode of each of the plurality of back-lights for controlling chromaticity of the light emitted from each of the plurality of back-lights, wherein at least two of the PWM signals are associated with different PWM values,
wherein a single frame is divided into four sub-frames, and the plurality of back-lights include red (R), green (G), and blue (B) light emitting diodes that are respectively driven in three of the four sub-frames, and the R, G and B light emitting diodes are simultaneously driven in a fourth sub-frame or at least one of the R, G and B light emitting diodes is driven in the fourth sub-frame, and
wherein the R, G, and B light emitting diodes are driven in an arbitrary order in the three sub-frames, and the fourth sub-frame is arbitrarily selected from among the four sub-frames.

12. A back-light driving circuit comprising:
a driving voltage generating means for providing a corresponding one of a plurality of driving voltages to each of a plurality of back-lights for causing each of the plurality of back-lights to emit light, wherein each of the back-lights includes at least one light emitting diode having a first terminal and a second terminal, wherein the corresponding one of the driving voltages is provided to the first terminal of the at least one light emitting diode of each of the back-lights, and wherein at least two of the driving voltages have different driving voltage values; and
a pulse width modulation (PWM) signal generating means for providing a corresponding one of a plurality of PWM signals to the second terminal of the at least one light emitting diode of each of the plurality of back-lights for controlling chromaticity of the light emitted from each of the plurality of back-lights, wherein at least two of the PWM signals are associated with different PWM values,
wherein the plurality of backlights are driven during a single frame including four sub-frames, the plurality of back-lights including red (R), green (G), and blue (B) light emitting diodes driven in three of the four sub-frames and a white (W) light emitting diode driven in a remaining sub-frame of the four sub-frames, and
wherein the R, G, B, and W light emitting diodes are driven in an arbitrary order within the four sub-frames.

13. A back-light driving circuit comprising:
a driving voltage generating means for providing a corresponding one of a plurality of driving voltages to each of a plurality of back-lights for causing each of the plurality of back-lights to emit light, wherein at least two of the driving voltages have different driving voltage values; and
a pulse width modulation (PWM) signal generating means for providing a corresponding one of a plurality of PWM signals to each of the plurality of back-lights for controlling chromaticity of the light emitted from each of the plurality of back-lights, wherein at least two of the PWM signals are associated with different PWM values,
wherein the plurality of back-lights include at least one of each of red (R), green (G), and blue (B) back-lights, and
wherein the plurality of back-lights include at least two back-lights associated with a same color, and the two back-lights associated with the same color receive different driving voltages of the driving voltages from the driving voltage generating means.

14. A back-light driving circuit comprising:
a driving voltage generating means for providing a corresponding one of a plurality of driving voltages to each of a plurality of back-lights for causing each of the plurality of back-lights to emit light, wherein at least two of the driving voltages have different driving voltage values; and
a pulse width modulation (PWM) signal generating means for providing a corresponding one of a plurality of PWM signals to each of the plurality of back-lights for controlling chromaticity of the light emitted from each of the plurality of back-lights, wherein at least two of the PWM signals are associated with different PWM values, wherein the plurality of back-lights include at least one of each of red (R), green (G), and blue (B) back-lights, and wherein the plurality of back-lights include at least two back-lights associated with a same color, and the two back-lights associated with the same color receive different PWM signals of the PWM signals from the PWM signal generating means.

15. A back-light driving circuit comprising:

a driving voltage generating means for providing a corresponding one of a plurality of driving voltages to each of a plurality of back-lights for causing each of the plurality of back-lights to emit light, wherein each of the back-lights includes at least one light emitting diode having a first terminal and a second terminal, wherein the corresponding one of the driving voltages is provided to the first terminal of the at least one light emitting diode of each of the back-lights, and wherein at least two of the driving voltages have different driving voltage values; and a pulse width modulation (PWM) signal generating means for providing a corresponding one of a plurality of PWM signals to the second terminal of the at least one light emitting diode of each of the plurality of back-lights for controlling chromaticity of the light emitted from each of the plurality of back-lights, wherein at least two of the PWN signals are associated with different PWM values, wherein the plurality of back-lights include red, green, and blue back-lights, and the driving voltage generating means includes a register with prestored driving voltages corresponding to the red, green, and blue back-lights.

* * * * *

UNITED STATES PATENT AND TRADEMARK OFFICE
CERTIFICATE OF CORRECTION

PATENT NO.       : 7,391,407 B2                                      Page 1 of 1
APPLICATION NO.  : 11/000395
DATED            : June 24, 2008
INVENTOR(S)      : Tae-Soo Kim

It is certified that error appears in the above-identified patent and that said Letters Patent is hereby corrected as shown below:

In the Claims

Column 14, line 10, Claim 15      Delete "PWN",
                                  Insert --PWM--

Signed and Sealed this

Sixteenth Day of December, 2008

JON W. DUDAS
*Director of the United States Patent and Trademark Office*